(12) United States Patent
Wetmore et al.

(10) Patent No.: US 8,069,141 B2
(45) Date of Patent: Nov. 29, 2011

(54) INTERFACES FOR HIGH AVAILABILITY SYSTEMS AND LOG SHIPPING

(75) Inventors: Alexander R. Wetmore, Seattle, WA (US); Laurion Burchall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 11/716,960

(22) Filed: Mar. 12, 2007

(65) Prior Publication Data

US 2008/0228832 A1 Sep. 18, 2008

(51) Int. Cl.
*G06F 17/00* (2006.01)

(52) U.S. Cl. ........ 707/610; 707/615; 707/616; 707/619; 707/626; 707/633; 707/634; 707/635; 707/638; 707/648

(58) Field of Classification Search ................. 707/204, 707/610, 615, 616, 619, 626, 633, 634, 635, 707/638, 648

See application file for complete search history.

(56) References Cited

U.S. PATENT DOCUMENTS

| | | | | |
|---|---|---|---|---|
| 5,884,324 | A * | 3/1999 | Cheng et al. ........................ | 1/1 |
| 6,192,365 | B1 * | 2/2001 | Draper et al. ................. | 707/101 |
| 6,889,231 | B1 * | 5/2005 | Souder et al. ........................ | 1/1 |
| 6,892,210 | B1 * | 5/2005 | Erickson et al. ............. | 707/201 |
| 7,107,294 | B2 * | 9/2006 | Romanufa et al. ..................... | 1/1 |
| 7,457,829 | B2 * | 11/2008 | East et al. ............... | 1/1 |
| 7,499,954 | B2 * | 3/2009 | Cherkauer et al. ............ | 707/202 |
| 7,529,783 | B2 * | 5/2009 | Cherkauer et al. ..................... | 1/1 |
| 7,617,262 | B2 * | 11/2009 | Prahlad et al. ......................... | 1/1 |
| 7,651,593 | B2 * | 1/2010 | Prahlad et al. ................. | 202/204 |
| 7,720,820 | B2 * | 5/2010 | Lomet ............................ | 707/682 |
| 7,778,976 | B2 * | 8/2010 | D'Souza et al. ............. | 707/665 |
| 7,917,475 | B2 * | 3/2011 | D'Souza et al. ............. | 707/656 |
| 2002/0049776 | A1 * | 4/2002 | Aronoff et al. ............... | 707/200 |
| 2003/0069903 | A1 * | 4/2003 | Gupta et al. ................... | 707/204 |
| 2004/0111410 | A1 * | 6/2004 | Burgoon et al. .................. | 707/4 |
| 2004/0158588 | A1 * | 8/2004 | Pruet, III ........................ | 707/204 |
| 2004/0212639 | A1 | 10/2004 | Smoot et al. | |
| 2004/0215724 | A1 * | 10/2004 | Smoot et al. ................... | 709/206 |
| 2004/0267809 | A1 * | 12/2004 | East et al. ................... | 707/104.1 |
| 2004/0267835 | A1 * | 12/2004 | Zwilling et al. .............. | 707/202 |
| 2006/0015764 | A1 | 1/2006 | Ocko et al. | |
| 2006/0047713 | A1 * | 3/2006 | Gornshtein et al. .......... | 707/202 |
| 2006/0095478 | A1 * | 5/2006 | Cherkauer et al. ............ | 707/202 |
| 2006/0136686 | A1 * | 6/2006 | Cherkauer et al. ............ | 711/162 |
| 2006/0179061 | A1 * | 8/2006 | D'Souza et al. ................ | 707/10 |
| 2006/0218200 | A1 * | 9/2006 | Factor et al. ................... | 707/200 |
| 2006/0218204 | A1 * | 9/2006 | Ofer et al. ...................... | 707/201 |

(Continued)

OTHER PUBLICATIONS

"Enterprise Messaging with Microsoft Exchange Server 2007", Date: Nov. 30, 2006, http://www.microsoft.com/technet/itshowcase/content/exchange2007.mspx.
"Replication and Log Shipping", Date: Apr. 14, 2006, http://msdn2.microsoft.com/en-us/library/ms151224.aspx.

(Continued)

*Primary Examiner* — Thanh-Ha Dang

(57) ABSTRACT

Architecture for replicating a database through log shipping. A replication service replicates data using one or more new internal application program interfaces (APIs), a replay configuration API which abstracts configuration information for each destination (or target) instance. APIs for log file management as part of the replication process are provided for opening communications for log shipping, tracking success of log shipping and closing out log shipping communications. Log shipping APIs are also provided for log truncation control. A ship control object is provided as a base class which includes an API for other components of the replication service to operate on log files when the log files are placed into a log directory. The ship control API is utilized by the replication service and for interaction with storage system log files.

17 Claims, 15 Drawing Sheets

U.S. PATENT DOCUMENTS

| | | | |
|---|---|---|---|
| 2007/0100912 A1* | 5/2007 | Pareek et al. | 707/204 |
| 2007/0143371 A1* | 6/2007 | Kottomtharayil | 707/204 |
| 2007/0162516 A1* | 7/2007 | Thiel et al. | 707/201 |
| 2007/0185937 A1* | 8/2007 | Prahlad et al. | 707/204 |
| 2007/0185939 A1* | 8/2007 | Prahland et al. | 707/204 |
| 2007/0186068 A1* | 8/2007 | Agrawal | 711/162 |
| 2007/0226438 A1* | 9/2007 | Erofeev | 711/162 |
| 2008/0306970 A1* | 12/2008 | Gilman | 707/10 |

OTHER PUBLICATIONS

Chapman, Tim, "Achieve high availability with log shipping in SQL Server 2000", Date: Nov. 6, 2006, http://builder.com.com/5100-6388_14-6132768.html.

Thompson, Dean, "How to Implement SQL Server Log Shipping Using Visual Basic", http://www.sql-server-performance.com/dt_log_shipping.asp, copyright 2002.

* cited by examiner

```
internal interface IReplayConfiguration
{
        ReplayConfigType Type { get; }
        string Name { get; }
        string Identity { get; }
        ObjectId IdentityObject { get; }
        bool IsLocalReplicaEnabled { get; }
        string LogFilePrefix { get; }
        string SourceLogPath { get; }
        string DestinationLogPath { get; }
        string E00LogBackupPath { get; }
        string LogExtension { get; }
        string NetworkSharePath { get; }
        string NetworkSharePathLastSource { get; }
        string NetworkSharePathNode { get; }
        string NetworkSharePathNodeLastSource { get; }
        string NetworkSharePathSharename { get; }
        string SourceSystemPath { get; }
        string DestinationSystemPath { get; }
        string LogInspectorPath { get; }
        string[] SourceEdbPaths { get; }
        string[] DestinationEdbPaths { get; }
        string[] DatabaseNames { get; }
        int CountOfDatabases { get; }
        bool HasPublicFolderDatabase { get; }
        bool IsReplicatedStorage { get; }
        string ServerName { get; }
        string StorageGroupDn { get; }
        Guid IdentityGuid { get; }
        ReplayState ReplayState { get; }
        List<ReplayState> OtherNodesReplayStates { get; }
        AutoDatabaseMountDial AutoDatabaseMountDial { get; }
        Int64 ForcedDatabaseMountAfter { get; }
        string [] GetBHServersInLocalSite();
        ExClusCommon.Resource StoreResource { get; }
        string SourceMachine { get; }
        bool CircularLoggingEnabled { get; }
}
```

*FIG. 7*

```
// LogShip interfaces
HRESULT ESEBACK_API
HrESELogShipOpen(
        IN  WCHAR *             wszLogShipServer,
        IN  WCHAR *             wszLogShipAnnotation,
        IN  WCHAR *             wszSGGuid,
        IN  WCHAR *             wszSGBaseName,
        IN  WCHAR *             wszSGLogFilePath,
        OUT HCCX *              phccxLogShipContext
        );

HRESULT ESEBACK_API
HrESELogShipSuccessful(
        IN  HCCX                hccxLogShipContext,
        IN  LONG                lgenReplayed,
        OUT LONG *              plgenTruncated
        );

HRESULT ESEBACK_API
HrESELogShipClose(
        IN  HCCX                hccxLogShipContext
        );
```

```
abstract internal class ShipControl : IStartStop
{
        protected ShipControl(
            string[] fromDir,
            string fromPrefix,
            long fromNumber,
            string fromSuffix,
            ISetBroken setBroken);

public void Start()
        public virtual void PrepareToStop()
        public void Stop()

public abstract Result ShipAction(long fromNumber);

public abstract void LogError
        public static string GenerationString(long
        generationNumber)
        public static long
        LowestGenerationInDirectory(DirectoryInfo di, string
        prefix, string suffix)
        public static long
        HighestGenerationInDirectory(DirectoryInfo di, string
        prefix, string suffix)
}
```

INTERFACES FOR HIGH AVAILABILITY SYSTEMS AND LOG SHIPPING

BACKGROUND

Corporations have long ago realized the importance of effective and efficient communications to customers and among employees. As communications technology continues to evolve in conjunction with wired and wireless communications more companies are buying into systems that facilitate not only communications (e.g., message, email, ... ) from many different locations but also from the myriad of different devices such as cell phones and portable computers. As companies become more technology dependent, reduced performance and/or failure in these systems can introduce a significant cost in both sales, resources, and lost time, just to name a few. Accordingly, more reliable systems (e.g., "high availability") are desired to not only provide service at all times, but also to maintain the latest versions of information.

One technique for providing the latest up-to-date information for all users of a server or system is data replication among multiple similar systems, or to specifically-designated backup systems. Log shipping is a replication technique for maintaining a continuous database copy. A transaction log is a file that contains a record of the changes that were made to a database. All changes to the database are recorded in the transaction log files before the changes are written into the database files. If a database shuts down unexpectedly, unfinished transactions can be restored by replaying the transaction log files into the database.

By being able to maintain the latest version of information on another or alternative system, businesses can potentially provide high availability services to customers and enterprise systems. However, in order to support high availability services, methods are desired that provide fast and efficient data access for replication purposes and for reliable management of log files. In enterprise deployments, for example, there can be multiple communications and collaboration systems and databases that require information updates. Accordingly, it is desirable to employ means for improving and/or optimizing data lookups and replication services.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a novel replication service which replicates database through log shipping. The replication service can replicate data at the storage group level and uses one or more new internal application program interfaces (APIs), for example, a replay configuration API which abstracts configuration information for each destination (or target) instance. The replay configuration API provides the configuration information necessary to replicate at least a single storage database. Encapsulating the configuration information in an API allows for optimization to the database for lookups and for building test instances, for example, of the replay service, which can then use configuration information associated different data storage architectures (e.g., SQL-structured query language).

Additionally, disclosed and described are APIs for log file management as part of the replication process. For example, a source storage system involved in replication should not delete log files until the files have been replayed by the replication target. Moreover, neither the source nor the target should delete log files until the desired storage system group has been backed up. APIs are described for use by the replication target to communicate to the replication source that a log file has been replayed, and replayed successfully. An API is also provided that communicates to the replication target which log files are now safe to delete.

A ship control object is provided as a base class which includes an API for other components of the replication service to operate on log files when the log files are placed into a log directory. The ship control API is utilized by the replication service and for interaction with storage system log files. A log ship open API can be called by the replication service when initializing replication for a storage system (e.g., a storage group). This API opens a connection to the store and returns a handle used for the remaining communications. A log ship successful API can be called by the replication service whenever a log file or group of log files have been successfully replayed on the target system (or replica). This API tells the server store the generation of the log which has most recently been replayed for example. The store then truncates logs (if there are any logs to truncate) and tells the replication service which logs may be truncated on the replica. A log ship close API is used to close the log shipping part of replication when replication for a storage system is shutting down.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 7 illustrates code for an exemplary replay configuration API.

FIG. 11 illustrates code for an exemplary log ship interface.

FIG. 12 illustrates code for an exemplary ship control API.

DETAILED DESCRIPTION

Figure 1:
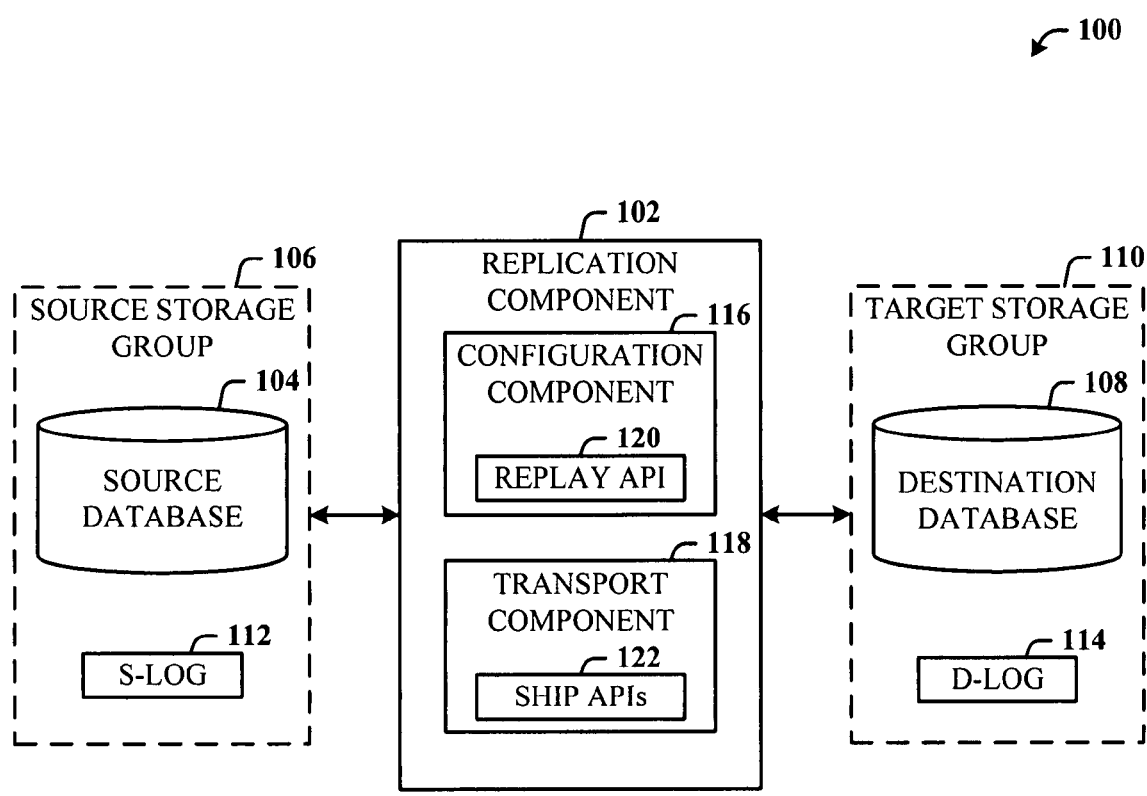
FIG. 1 illustrates a computer-implemented system for managing data.

The disclosed architecture includes several application program interfaces (APIs) in support of replication services for high availability of one or more network services using replication by log shipping. The replication service can include an API for accessing configuration data for processing at the target. Additionally, APIs are provided for managing log file shipping by opening and closing transport operations, indicating success of replication and replay, and truncation of log files at the source and the target, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 for managing data. The system 100 includes a replication component 102 for replicating a source database 104 (e.g., optionally, of a source storage group 106) to a destination (or target) database 108 (e.g., optionally, of a destination or target storage group 110) via a source transaction log 112 (denoted S-LOG), also referred to as log shipping. In other words, the source log 112 is communicated to a directory associated with the destination database 108, thereby becoming a destination log 114 (denoted D-LOG).

The system 100 also includes a configuration component 116 for providing access to configuration information for replication of the source database 104 to the destination database 108. A transport component 118 provides an interface for processing of the transaction log 112. For example, the transport component 118 manages deletion of the transaction log 112 at the source subsequent to replay of the log 112 at the destination.

The configuration component 116 can employ an internal replay API 120 for replay processing of the source log 112 at the destination. Additionally, the transport component 118 can include one or more ship (or shipping) APIs 122 for log management, including transport and truncation. For example, one of the shipping APIs 122 functions to inform the replication component 102 that the source transaction log 112 can be deleted at the source.

The system 100 includes a replication service (as part of the replication component 102), which replicates the source database 104 through log shipping at, for example, a storage group level (e.g., storage groups 106 and 110).

The configuration component 116 can employ the internal replay API 120 (referred to herein as IReplayConfiguration) which abstracts the configuration data for each replica instance. Encapsulating some or all of the configuration information in the replay API 120 allows for optimization of lookups in the data base system (e.g., Active Directory™ by Microsoft Corporation) and for building test instances of the replay service which can use configuration data outside of the database system.

In one exemplary implementation, the system 100 can be employed as part of a communications and collaboration system (e.g., Exchange Server™ by Microsoft Corporation). More specific descriptions of the APIs are provided infra.

Figure 2:
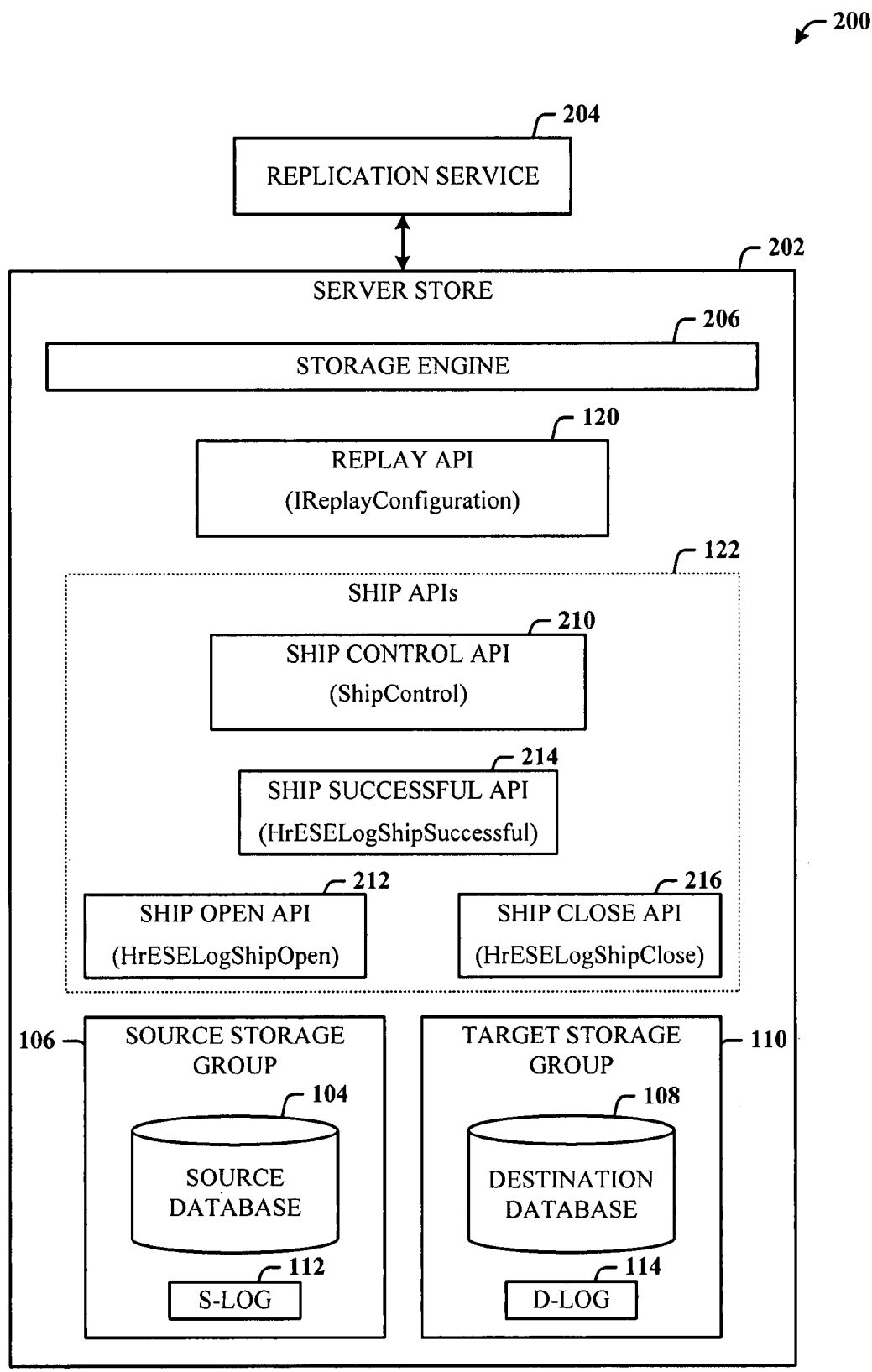
FIG. 2 illustrates an exemplary implementation of the disclosed high availability architecture as part of a communications system.

FIG. 2 illustrates an exemplary implementation of the disclosed high availability architecture as part of a communications system 200. Generally, the system 200 can be a collaboration and communications server for providing wired and wireless communications and collaboration services in public and/or enterprise settings, for example. The system 200 includes a server store 202 for data management and storage. In support of data replication, the system 200 includes a replication service 204 for accessing APIs associated with log replay (e.g., replay API 120) and log file shipping (e.g., ship APIs 122).

In support of maintaining continuous connectivity for employees, for example, log shipping replication is employed to replicate the source database 104 of the source storage group 106 by shipping the source log file 112 to a destination system log directory (not shown) in the target storage group 110 for replay at the target storage group 110. Eventually, after proper controls have been executed, the source log file 112 will become the destination log file 114, which will then be replayed.

In support thereof, the replication service 204 calls the replay API 120 to provide the configuration information necessary to replicate a single storage group (e.g., group 106 or group 110). The replay API 120 can be a C# interface that obtains the configuration data from the destination database system 108 (e.g., Active Directory). Examples of data that can be accessed by the replay API 120 include the location of the source and destination databases, location and names of the log files, and storage group name and GUID (globally unique identifier) for the storage group. Other API member properties will be provided hereinbelow with respect to the exemplary IReplayConfiguration API employed.

In one implementation, a storage engine (e.g., ESE) 206 is an API built on top of RPC (remote procedure call) which is used to communicate between a replication service 204 and the server store 202 for replaying log files. In an alternative implementation, or in combination therewith, RPC is used to the store for log truncation. The storage engine 206 can determine the structure of the underlying database(s) and can manage memory for fast replication and log file processing. Storage engine log shipping APIs 122 can be implemented by the server store 202 and are employed by the server replication service 204. In one implementation, the log APIs 122 provide a mechanism for the server replication service 204 and server store 202 to determine when it is safe for log files to be deleted (or truncated). More extensively, the log ship APIs 122 facilitate at least the transport, open, close, and successful state of log replication.

The ship APIs 122 can include a base ship control API 210 (e.g., named ShipControl), a ship open API 212 (e.g., named HrESELogShipOpen), a ship successful API 214 (e.g., named HrESELogShipSuccessful), and a ship close API 216 (e.g., named HrESELogShipClose), examples of which will be provided infra. Although indicated as potentially operating with ESE, this is not a requirement. ESE is a method that defines a low-level API to the underlying database structures. The storage engine 206 can also utilize log buffers to hold information in RAM before writing to the transaction logs (112 and 114).

The source storage group 106 should not delete log files until the files have been replayed by the replication target storage group 110. Moreover, neither the source storage group 106 nor the target storage group 110 should delete log files until the source storage group 106 has been successfully backed up. Note that the target storage group 110 can also or alternatively be backed up. The ship successful API 214 is used by the replication target group 110 to communicate to the replication source group 106 that the log file at the target has been replayed. The ship successful API 214 also tells the replication target group 110 which of the log files are now safe to delete.

The ship control API 210 is the base class which provides an API for other components of the replication service 204 to operate on log files (112 and 114) when placed into a log directory. The ship control API 210 is utilized by the replication service 204 and provides service interaction with storage engine log files.

The ship open API 212 is called by the replication service 204 when initializing replication for a storage group (106 or 110). The ship open API 212 opens a connection to the store 202 and returns a handle used for the remaining communications. The ship successful API 214 is called by the replication service 204 whenever a log file or group of log files has been successfully replayed at the destination (target storage group 110). The ship successful API 214 can tell the server store 202 the generation (or version) of the log which has most recently been replayed.

Figure 3:
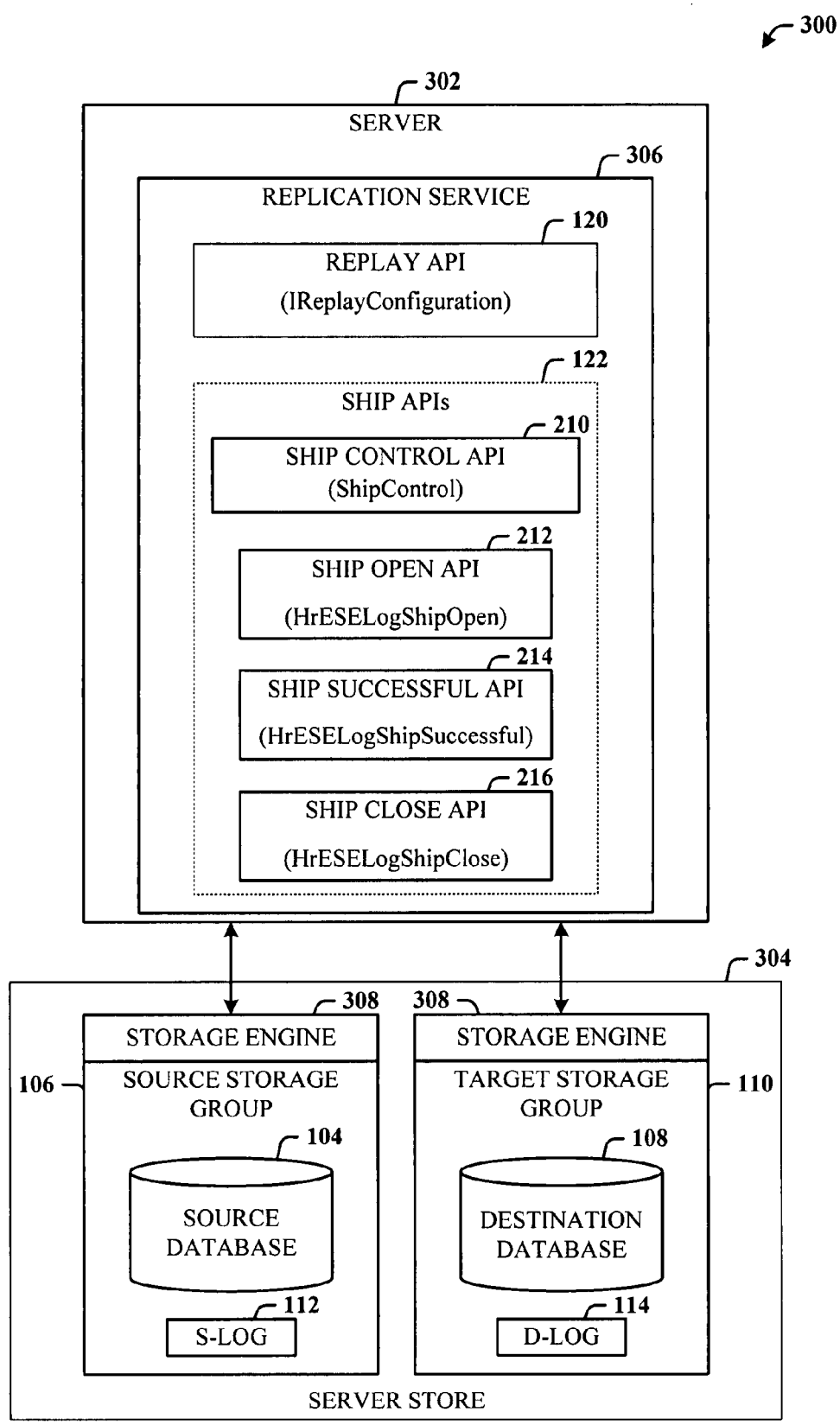
FIG. 3 illustrates an alternative implementation of the disclosed high availability architecture as part of a communications system.

FIG. 3 illustrates an alternative implementation of the disclosed high availability architecture as part of a communications system 300. Generally, the system 300 can include a collaboration and/or communications server 302 for providing wired and wireless communications and collaboration services in public and/or enterprise settings, for example. The server 302 includes a server store 304 for data management and storage. In support of data replication, the server 302 includes a replication service 306 for accessing APIs associated with log file replay (e.g., replay API 120) and log shipping management APIs (e.g., ship APIs 122).

In support of maintaining continuous connectivity for employees, for example, log shipping replication is employed to replicate source database 104 associated with the source log file 112 of the source storage group 106 to a destination system log directory (not shown) in the target storage group 110 for replay at the target storage group 110. Eventually, after proper controls have been executed, the replicated source log file 112 will become the destination log file 114, which will be replayed to update the destination database system 108.

In support thereof, the replay API 120 provides the configuration information necessary to replicate a single storage group (e.g., group 106 or group 110). The replay API 120 can be a C# interface that obtains the configuration data from the destination database system 108 (e.g., Active Directory). Examples of data provided by the replay API 120 include the location of the source and destination databases, location of the log files, and storage group name and GUID (globally unique identifier) for the storage group. Other API member properties will be provided hereinbelow with respect to the exemplary IReplayConfiguration API employed. The replay API 120 is extensible in that variables can be changed and/or added.

A storage engine (e.g., ESE) 308 is an API in communication with RPC (remote procedure call) which is used to communicate between the replication service 306 and the server store 304. The storage engine 308 can determine the structure of the underlying database and can manage memory for fast replication and log file processing. Storage engine log shipping APIs 122 can be implemented by the server 302 and are employed by the server replication service 306. In one implementation, the log APIs 122 provide a mechanism for the server replication service 306 and server store 304 to determine when it is safe for log files to be deleted (or truncated). More extensively, the log ship APIs 122 facilitate at least the transport, open, close, and successful state of log replication.

The ship APIs 122 can include the base ship control API 210 (e.g., named ShipControl), the ship open API 212 (e.g., named HrESELogShipOpen), the ship successful API 214 (e.g., named HrESELogShipSuccessful), and the ship close API 216 (e.g., named HrESELogShipClose), examples of which will be provided infra. Although indicated as potentially operating with ESE, this is not a requirement. ESE is a method that defines a low-level API to the underlying database structures. The storage engine can utilize log buffers to hold information in RAM before writing to the transaction logs.

The source storage group 106 should not delete log files until the files have been replayed by the replication target group 110. Moreover, neither the source storage group 106 nor the target storage group 110 should delete log files until the source storage group 106 has been successfully backed up. The ship successful API 214 is used by the replication target group 110 to communicate to the replication source group 106 that the log file has been replayed. The ship successful API 214 also tells the replication target group 110 which of the log files are now safe to delete.

The ship control API 210 is the base class which provides an API for other components of the replication service 306 to operate on log files when placed into a log directory. The ship control API 210 is utilized by the replication service and the service interaction with storage engine log files.

The ship open API 212 is called by the replication service 306 when initializing replication for a storage group. The ship open API 212 opens a connection to the store 304 and returns a handle used for the remaining communication. The ship successful API 214 is called by the replication service 306 whenever a log file or group of log files has been successfully replayed at the destination (target storage group 110). The ship successful API 214 tells the server store 304 the generation (or version) of the log which has most recently been replayed.

Figure 4:
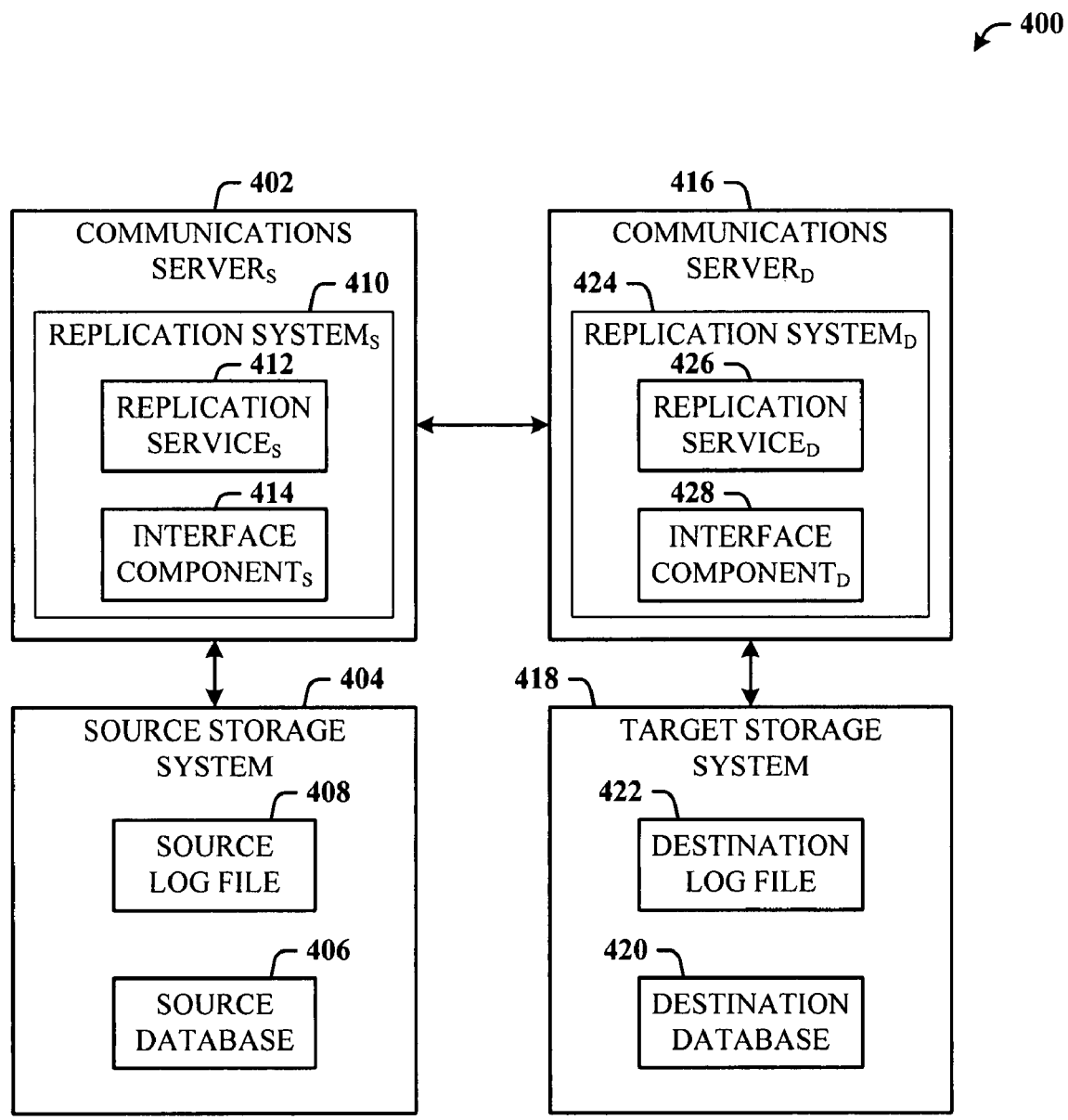
FIG. 4 illustrates an alternative system of multiple communications servers that employ replication and log shipping in accordance with the disclosed architecture.

FIG. 4 illustrates an alternative system 400 of multiple communications servers that employ replication and log shipping in accordance with the disclosed architecture. The system 400 is illustrated in a head-to-head arrangement of two systems; however, it is to be understood that more systems could be deployed in communication, as in an enterprise, for example. Here, a source communications server 402 (denoted COMMUNICATIONS SERVER$_S$) includes a source storage system 404 for data replication. Changes to a source database (e.g., a file) 406 of the source storage system 404 are tracked and logged in a source log file 408. In support thereof, the source server 402 includes a source replication system 410, which further employs a source replication service 412 (denoted REPLICATION SERVICE$_S$) and a source interface component 414 (denoted INTERFACE COMPONENT$_S$) including one or more APIs for configuration data access and log shipping management.

Similarly, a destination communications server 416 (denoted COMMUNICATIONS SERVER$_D$) includes a destination (or target) storage system 418 for data replication. Changes to a destination database (e.g., a file) 420 of the destination storage system 418 are tracked and logged in a destination log file 422. In support thereof, the destination server 416 includes a destination replication system 424, which further employs a destination replication service 426 (denoted REPLICATION SERVICE$_D$) and a destination interface component 428 (denoted INTERFACE COMPO- NENT$_D$) including one or more APIs for configuration data access and log shipping management.

In one exemplary operation, when the source log file 408 is placed in a source log directory (not shown), the replication service 412, alone or in combination with the source interface component 414 initiates the replication process. Here, replication is not between local database files, for example, but to the remote destination database 420. The source replication service 412 can communicate with the destination replication service 426 to perform at least log shipping using the APIs provided by the source interface component 414 and/or by the destination interface component 428. When the source log file 408 appears in the destination log directory (not shown), the destination replication service 426 initiates replay of the log file to the destination database. API functionality, as described herein, applies for both the source and destination servers (402 and 416). In the reverse scenario, replication can occur from the labeled destination server 416 to the source server 402, by employing the destination replication service 426 and, based on interaction between the destination interface component 428 and/or by the source interface component 414.

In one implementation, either or both of the communications servers (402 or/and 416) can be mid-tier systems. Alternatively, the communications servers (402 and 416) can be distributed between mid-tier and backend systems.

Figure 5:
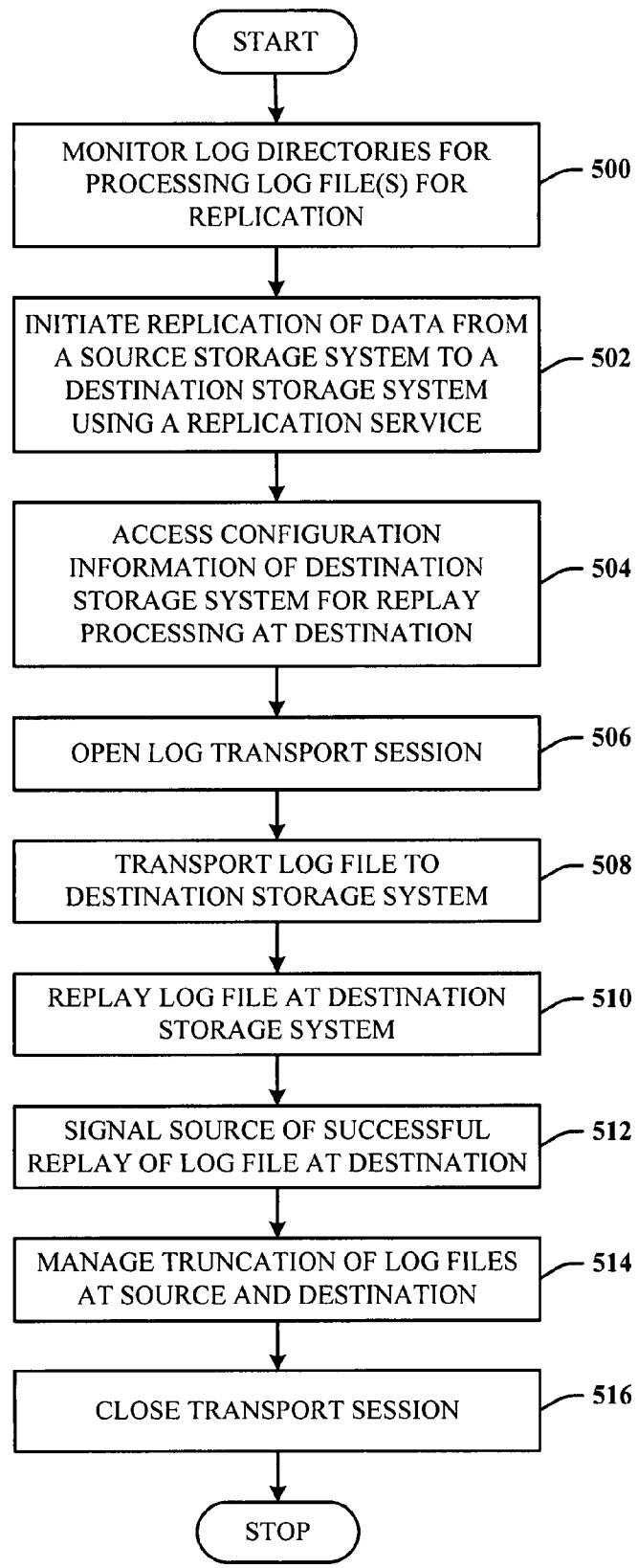
FIG. 5 illustrates a method of replicating data by log file shipping.

FIG. 5 illustrates a method of replicating data by log file shipping. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts in a methodology may be required for a novel implementation.

At 500, log directories are monitored for processing of log file(s) for data replication. At 502, data replication of data from source to destination storage systems is initiated using replication service. At 504, configuration information of the destination storage system is accessed via a configuration API for replay processing at the destination. At 506, a log transport session is opened via a ship open API. At 508, the log file is transported to a destination storage system. At 510, the log file is replayed at the destination to update the destination storage system database. At 512, the source is signaled that the replay at the destination was successful. At 514, the log files remaining after successful replay at the destination are managed for truncation. At 516, the transport session is closed.

Figure 6:
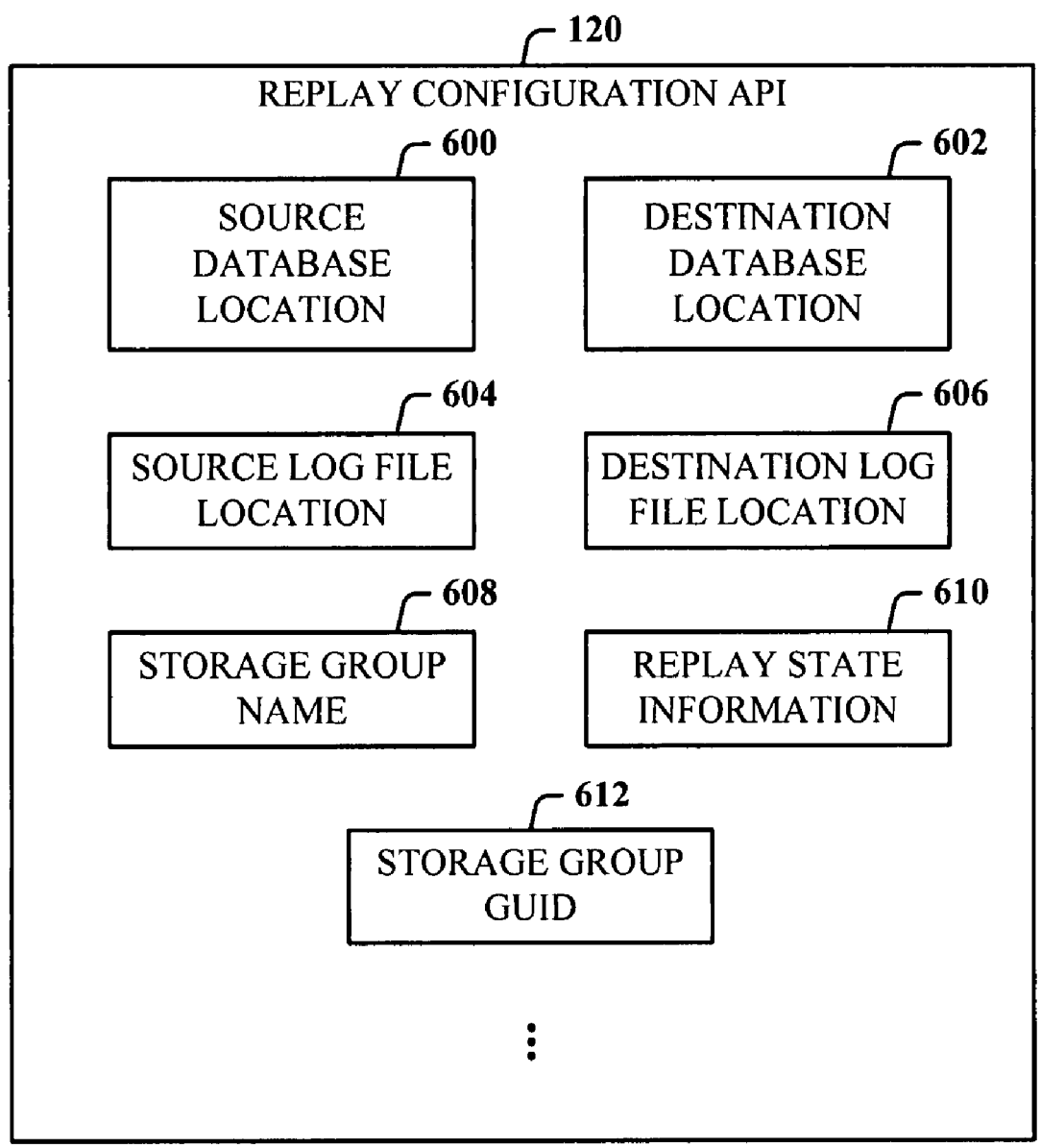
FIG. 6 illustrates a diagram of configuration information accessible by the replay configuration API.

FIG. 6 illustrates a diagram of configuration information accessible by the replay configuration API 120. The API 120 provides access to the configuration information for replicating a database. The API 120 can includes class members that represent location of the source database (600), location of the destination database (602), location of the source log file(s) (e.g., source log directory) (604), location of the destination log file(s) (e.g., destination log directory) (606), storage group name (608), replay state information (610), and storage group GUID (612). Other configuration information can also be accessed via the API 120, as will be shown in the exemplary API code of FIG. 7. FIG. 7 illustrates code 700 for an exemplary replay configuration API (IReplayConfiguration).

The log shipping APIs 122 are implemented by the server store (e.g., Exchange Server™ by Microsoft Corporation) and are used by the server replication service as a mechanism for the replication service and server store to determine when it is safe for log files to be deleted. As described supra, the shipping APIs 122 include three APIs: the ship open API 212, ship successful API 214, and the ship close API 216.

Figure 8:
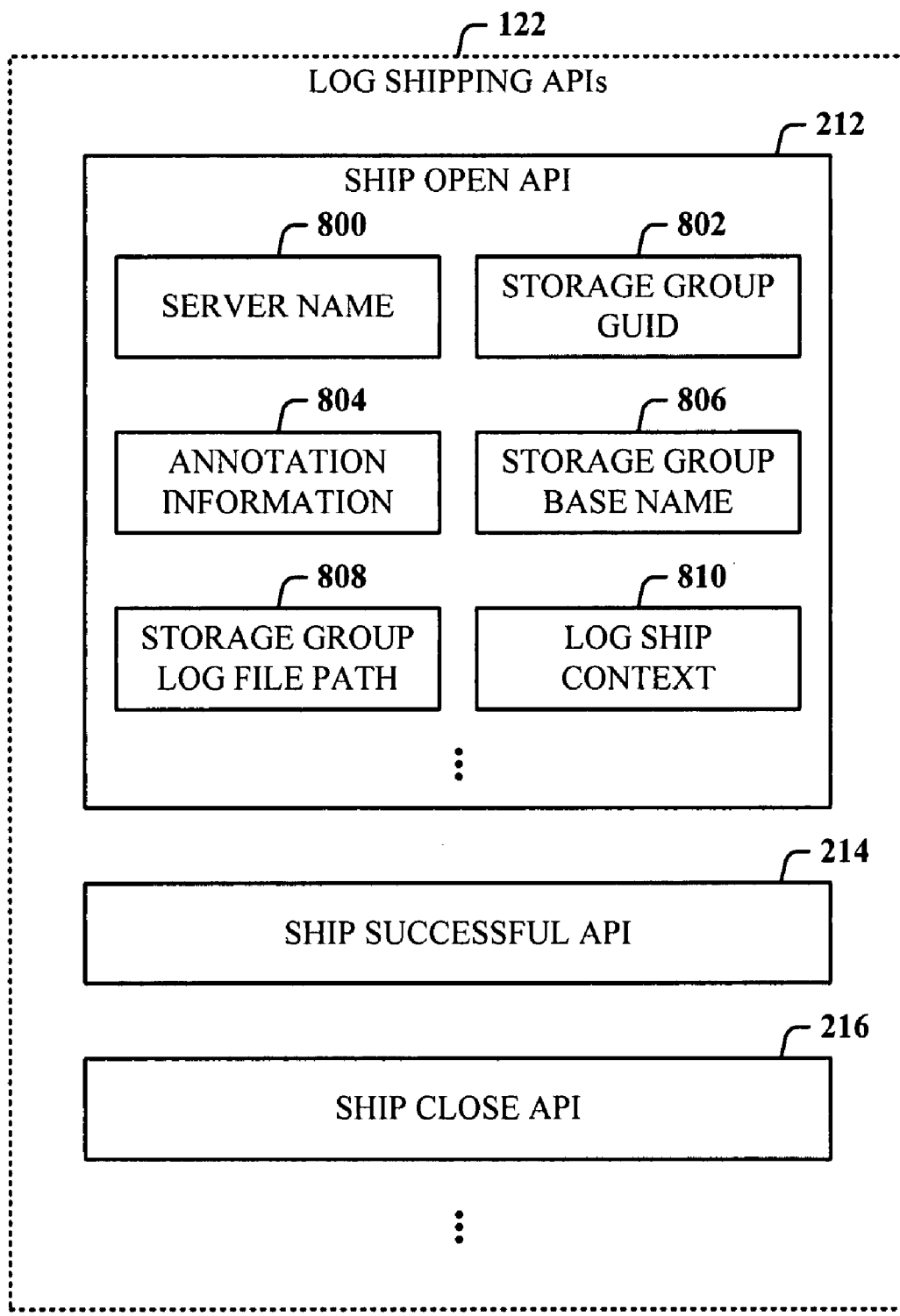
FIG. 8 illustrates a diagram of information accessible by the ship open API of the log shipping APIs.

The ship open API 212 is called by the replication service when initializing replication for a storage group. This API 212 opens a connection to the store and returns a handle used for the remaining communication. FIG. 8 illustrates a diagram of information accessible by the ship open API 212 of the log shipping APIs 122. The ship open API 212 can include properties related to server name (800), storage group GUID (802), annotation information (804), storage group base name (806), storage group log file path (808), and log ship context (810). Other configuration can also be accessed via the ship open API 212 as well.

Figure 9:
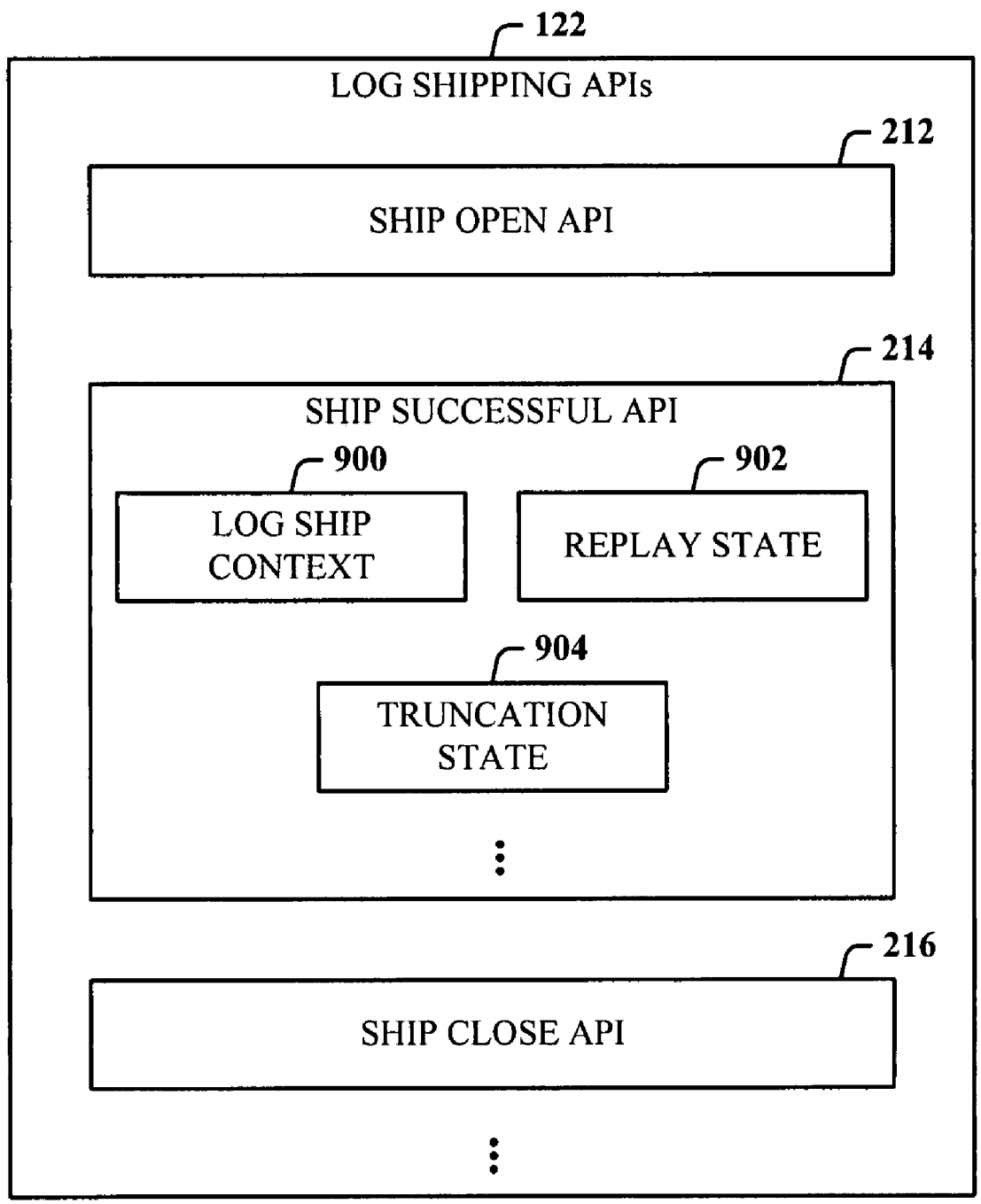
FIG. 9 illustrates a diagram of information accessible by the ship successful API of the log shipping APIs.

The ship successful API 214 is called by the replication service whenever a log file or group of log files has been successfully replayed on the replica. FIG. 9 illustrates a diagram of information accessible by the ship successful API 214 of the log shipping APIs 122. The ship successful API 214 can include properties related to log ship context (900), replay state (902), and truncation state (904). Other configuration can also be accessed via the ship open API 214 as well.

Figure 10:
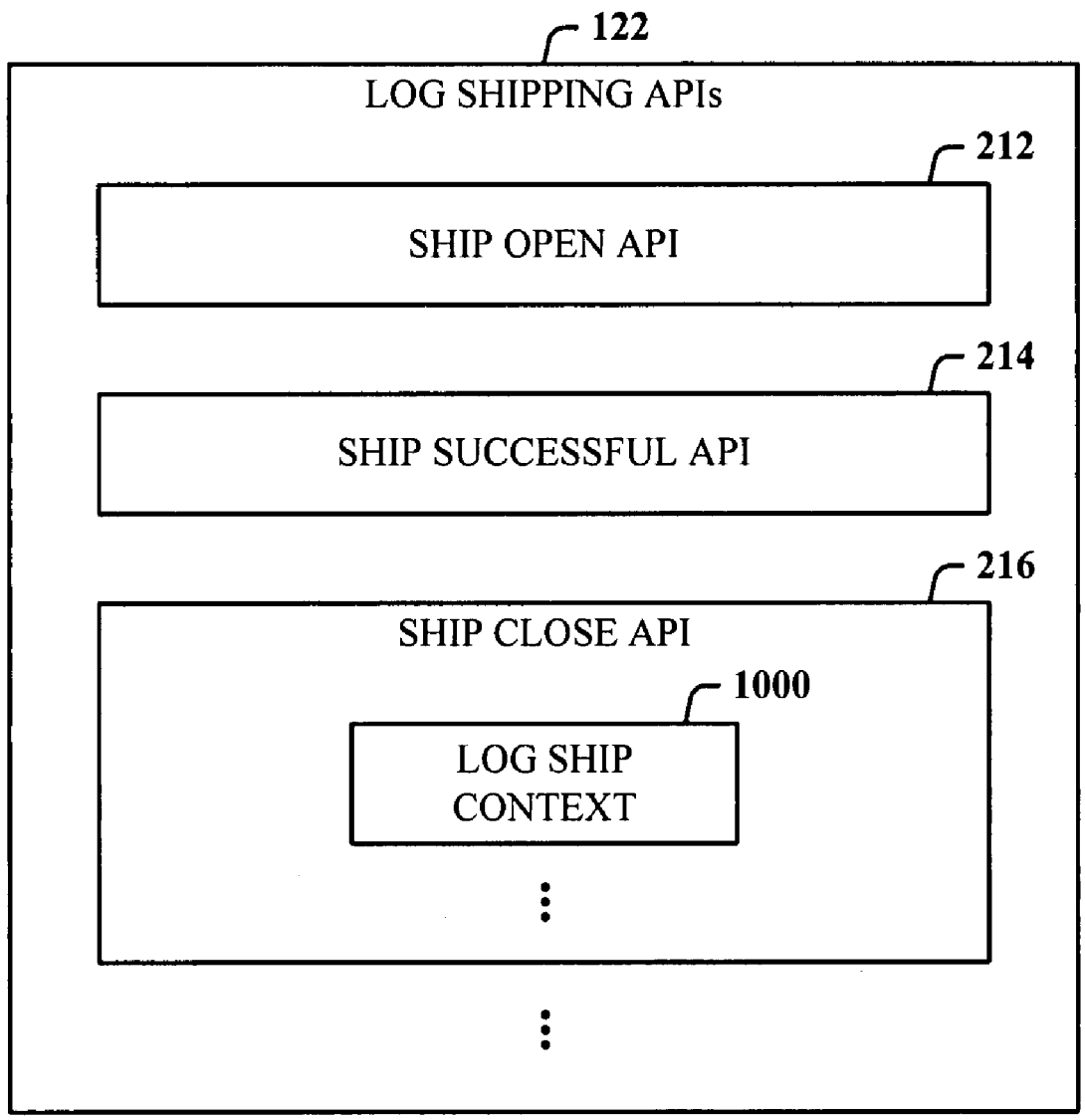
FIG. 10 illustrates a diagram of information accessible by the ship close API of the log shipping APIs.

The ship close API 216 is used to close the shipping mechanism when replication for a storage group is shutting down. FIG. 10 illustrates a diagram of information accessible by the ship close API 216 of the log shipping APIs 122. The ship close API 216 can include log ship context information 1000, as well as other information as desired.

FIG. 11 illustrates code 100 for an exemplary log ship interface 122 of FIG. 2. The code includes interfaces HrESELogShipOpen, HrESELogShipSuccessful and HrESELogShipClose. The code 1100 is executed to tell the server store the generation of the log which has most recently been replayed, in a parameter IgenReplayed. The server store then truncates logs if there are logs to truncate and tells the replication service which logs can be truncated on the replica. This is returned through parameter pIgenTruncated.

FIG. 12 illustrates code 1200 for an exemplary ship control API (ShipControl). The ship control API can be an abstract C# class which provides an API to watch a directory or set of directories for log files and to act upon the log files in the directories. At startup, the ship control API is initialized with the set of directories to watch, the log file prefix (e.g., ESE base name) to watch for, and the log generation to start watching from. When a new log file is found in the log directory, the ship control API calls a method ShipAction. Subclasses of ShipControl provide an implementation of ShipAction which can copy logs from one location to another, replay the logs into the replica database, or perform other operations with the logs. The ShipControl API also provides helper functions for scanning a directory of ESE log files to find the lowest and highest numbered files in the directory.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
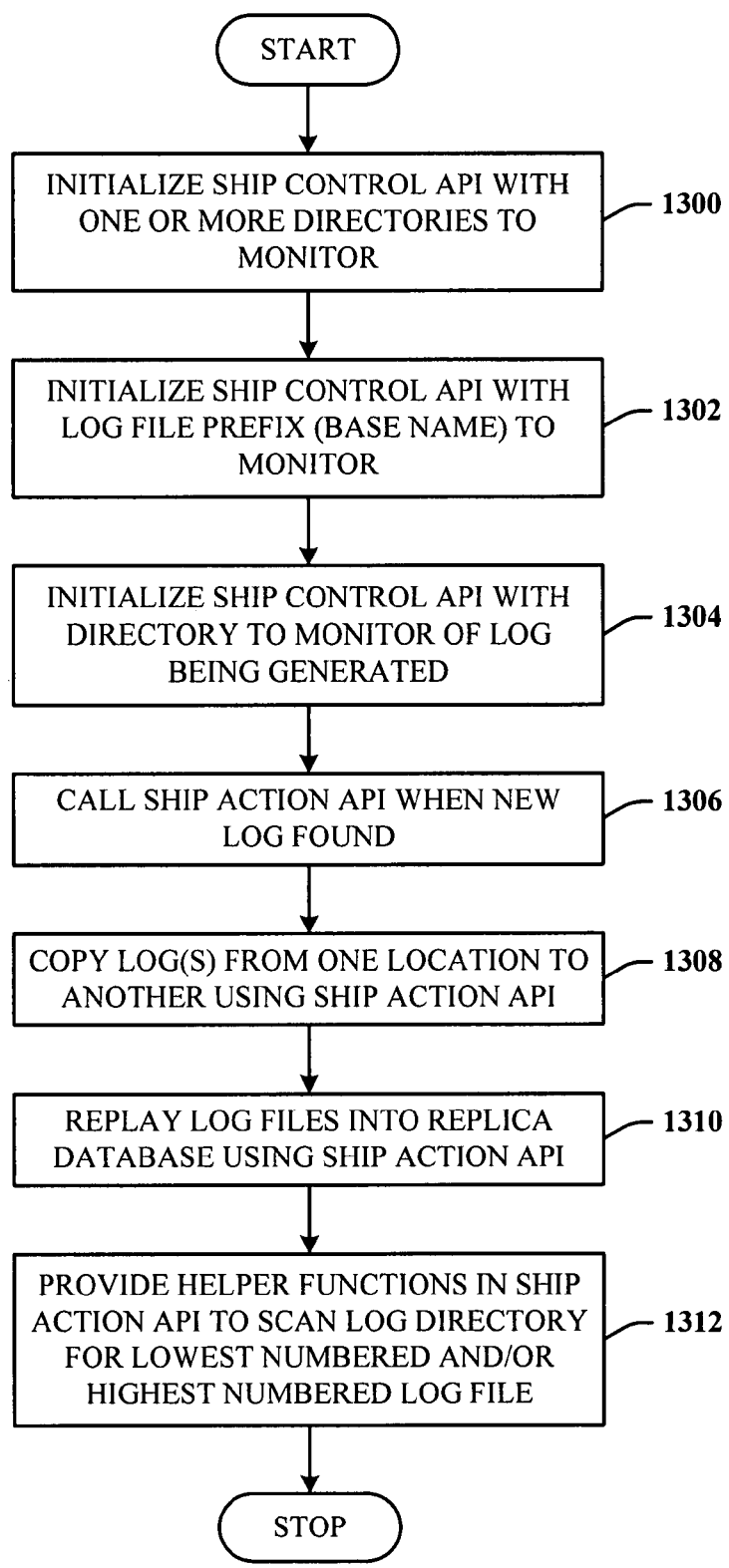
FIG. 13 illustrates a method of controlling log shipping.

FIG. 13 illustrates a method of controlling log shipping. At 1300, the ship control API is initialized with one or more log directories to monitor. At 1302, the ship control API is initialized with a log file prefix (e.g., a base name) to monitor. At 1304, the ship control API is initialized with a directory to monitor for a log file being generated. At 1306, a ship action API is called when a new log is found. At 1308, one or more logs of one location are copied to another location using the ship action API. At 1310, the log file(s) are replayed into the replica database using the ship action API. At 1312, helper functions are provided in the ship action API to scan the log directory for the lowest numbered and/or highest numbered log file.

Figure 14:
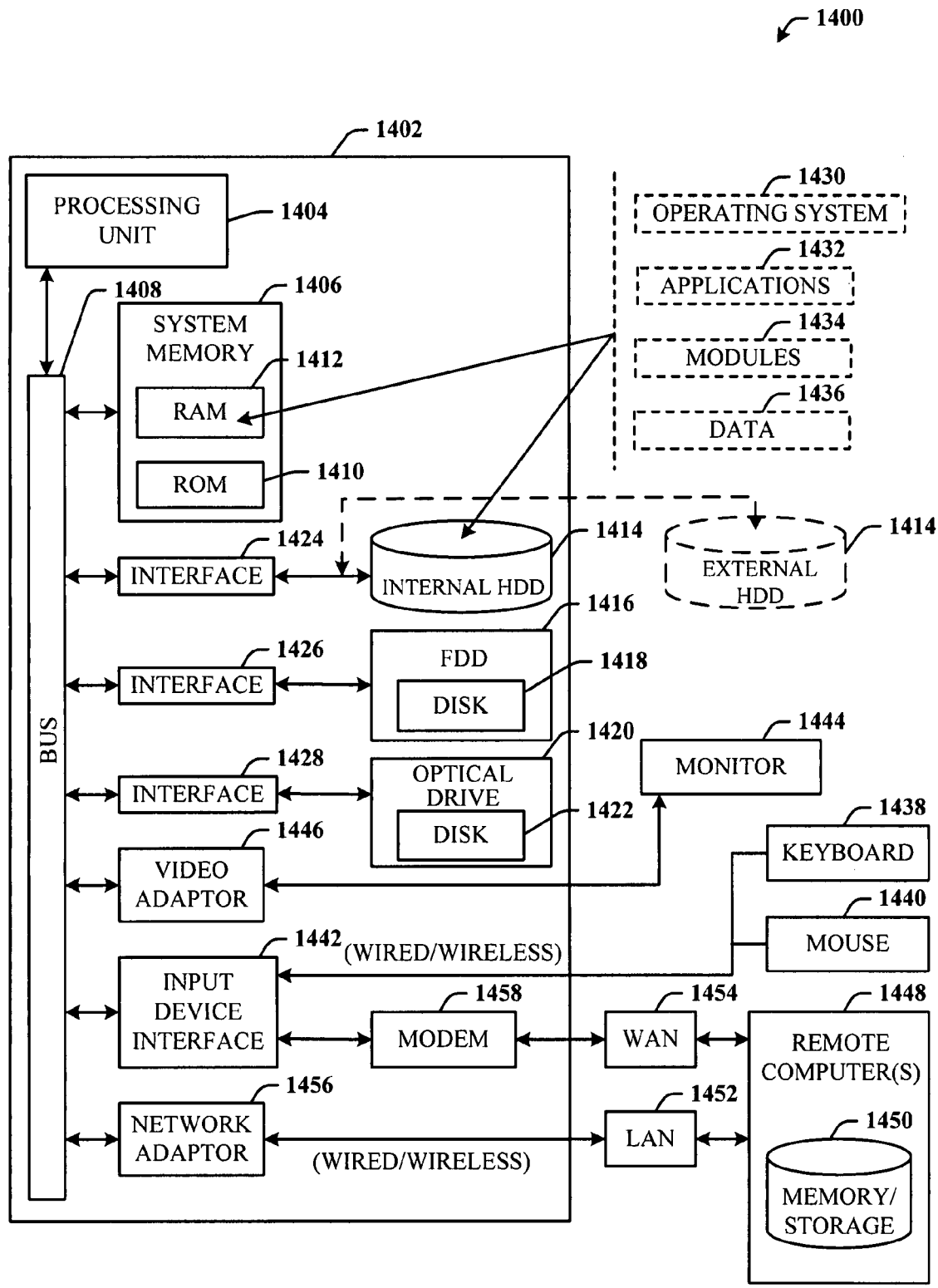
FIG. 14 illustrates a block diagram of a computing system operable to execute the disclosed replication and log shipping architecture.

Referring now to FIG. 14, there is illustrated a block diagram of a computing system 1400 operable to execute the disclosed replication and log shipping architecture. In order to provide additional context for various aspects thereof, FIG. 14 and the following discussion are intended to provide a brief, general description of a suitable computing system 1400 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects described herein may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary computing system 1400 for implementing various aspects includes a computer 1402, the computer 1402 including a processing unit 1404, a system memory 1406 and a system bus 1408. The system bus 1408 provides an interface for system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1494 interface technologies. Other external drive connection technologies are within contemplation of the subject architecture.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed architecture.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the disclosed architecture can be implemented with various commercially available operating systems or combinations of operating systems. The applications 1432 and/or modules 1434 can include functionality associated with the components described herein as well as the APIs 120 and 122, and services (e.g., replication).

A user can enter commands and information into the computer 1402 through one or more wired/wireless input devices, for example, a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Figure 15:
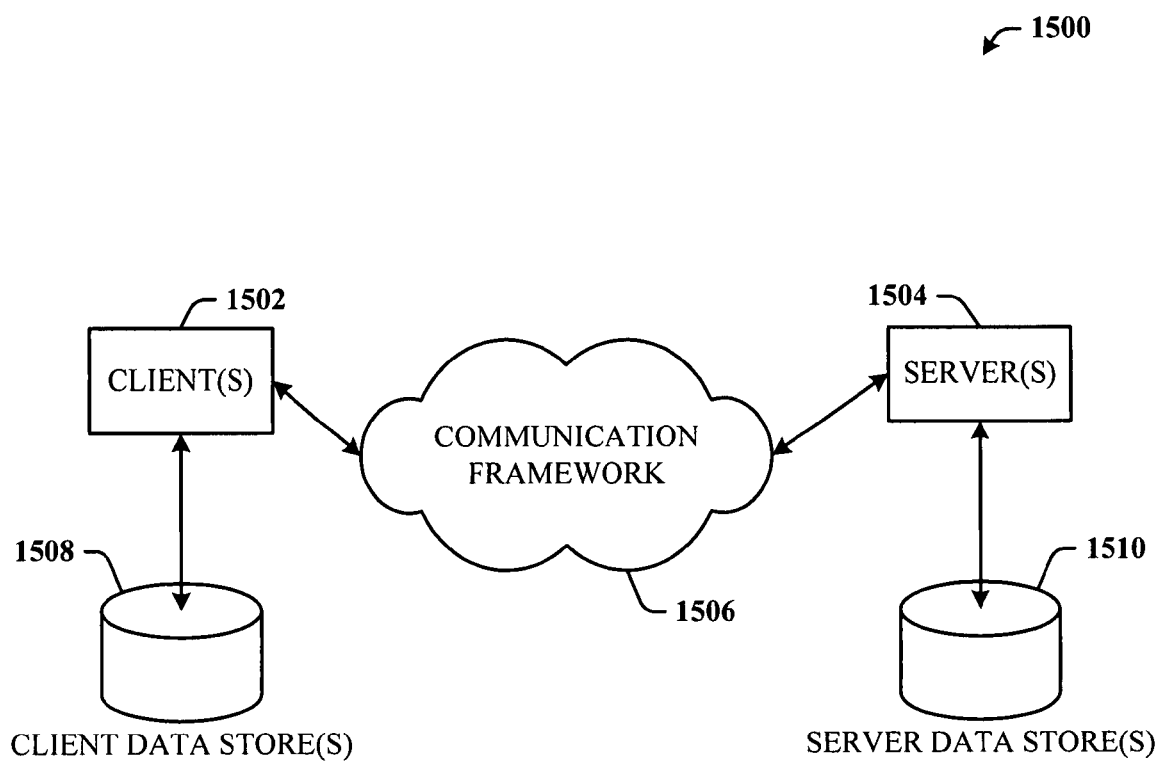
FIG. 15 illustrates a schematic block diagram of an exemplary computing environment for the disclosed replication and log shipping architecture.

Referring now to FIG. 15, there is illustrated a schematic block diagram of an exemplary computing environment 1500 for the disclosed replication and log shipping architecture. The system 1500 includes one or more client(s) 1502. The client(s) 1502 can be hardware and/or software (e.g., threads, processes, computing devices). The client(s) 1502 can house cookie(s) and/or associated contextual information, for example.

The system 1500 also includes one or more server(s) 1504. The server(s) 1504 can also be hardware and/or software (e.g., threads, processes, computing devices). The servers 1504 can house threads to perform transformations by employing the architecture, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504. The servers 1504 and associated data stores 1510 can be included as part of the systems used for replication.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of managing data, comprising acts of:

generating a transaction log file for a source database of a source storage group using a replication service, the transaction log file comprises data that includes location of the source database and the destination database, a location of the transaction log file, a name of the transaction log file, a name of at least one of the source or destination storage group, and a globally unique identifier (GUID) for the respective storage group;

initializing a ship control application programming interface (API) for monitoring a transaction log directory of the source storage group for generation of the transaction log file using the replication service;

calling a ship action API upon detection of the generated transaction log file;

opening a connection to the source storage group in response to detecting the transaction log file based on a ship open API;

shipping the transaction log file to a destination storage group using the ship action API;

replaying the transaction log file to a destination database of the destination storage group using the ship action API;

communicating to the source storage group that the transaction log file has been successfully replayed at the destination storage group using a log ship successful API; and utilizing a processor to execute instructions stored in memory to perform at least one of the acts of generating, initializing, calling, opening, shipping, replaying and communicating.

2. The method of claim 1, further comprising accessing configuration information for replay of the transaction log file at the destination database.

3. The method of claim 2, wherein the configuration information includes at least one of location information of the source storage group and the destination storage group, transaction log file information, or other storage group information.

4. The method of claim 1, further comprising closing the connection at completion of the transaction log file being replayed.

5. The method of claim 1, wherein the source storage group and the destination storage group are part of a mid-tier communications server.

6. The method of claim 1, further comprising scanning a directory of transaction logs of the source storage group for at least one of a lowest numbered log file or a highest numbered log file.

7. The method of claim 1, further comprising scanning a directory of transaction logs of the source storage group for a log file prefix and a log undergoing creation.

8. The method of claim 1, further comprising signaling at least one of the source storage group or the destination storage group when to delete corresponding log files.

9. The method of claim 1, further comprising processing replay of the log file at the destination database using an internal replay API.

10. The method of claim 1, further comprising employing at least one shipping API for log management, including transport and truncation.

11. The method of claim 10, wherein at least one shipping API indicates that the log file can be deleted at the source database.

12. A computer-implemented system, comprising:

computer-implemented means for initializing a ship control application programming interface (API) for monitoring a transaction log directory of a source database of a source storage group for generation of a log file, the log file comprises data that includes location of the source database and the destination database, a location of the log file, a name of the log file, a name of a storage group, and a globally unique identifier (GUID) for the storage group;

computer-implemented means for opening a connection to the source storage group in response to detecting the log file;

computer-implemented means for calling a ship action API upon detection of the generated log file;

computer-implemented means for shipping the log file to a destination storage group using the ship action API;

computer-implemented means for replaying the log file to a destination database of the destination storage group using the ship action API; and computer-implemented means for deleting the log file and one or more other log files after successful replay;

computer-implemented means for communicating to the source storage group that the log file has been successfully replayed at the destination storage group using a log ship successful API; and processor means for executing instructions stored in memory to implement at least one of the means for monitoring, opening, shipping, replaying or deleting.

13. The computer-implemented system of claim 12, wherein the means for replaying further comprises an internal replay API for replay processing of the log file at the destination database.

14. The computer-implemented system of claim 12, further comprising a shipping API for log management, including log transport and log truncation.

15. The computer-implemented system of claim 14, wherein the shipping API informs the means for deleting that the log file can be deleted at the source database.

16. The computer-implemented system of claim 12, further comprising computer-implemented means for accessing configuration information for replay of the log file at the destination database of the destination storage group.

17. The computer-implemented system of claim 16, wherein the configuration information includes at least one of location information of the source storage group and the destination storage group, log file information, or other storage group information.

* * * * *